Nov. 6, 1962 R. C. HILL 3,061,967
FISHING IMPLEMENT
Filed Oct. 31, 1960

INVENTOR
RAYMOND C. HILL

BY Mead, Browne, Schuyler & Beveridge

ATTORNEYS

One of the figures:

United States Patent Office 3,061,967
Patented Nov. 6, 1962

3,061,967
FISHING IMPLEMENT
Raymond C. Hill, 1910 6th Ave., Dodge City, Kans.
Filed Oct. 31, 1960, Ser. No. 66,302
1 Claim. (Cl. 43—17.2)

This invention relates to fishing implements, and more particularly to an implement useful for freeing a fouled fishing lure or line or for severing a fishing line at a point closely adjacent a lure which has been snagged on underwater or overhead objects.

It is a primary object of the invention to provide a relatively compact implement of the type described above which may be readily guided to a fouled or snagged lure and which may be readily manipulated either to free the lure or to sever the line at a point closely adjacent the hook in the event efforts to free the hook are unsuccessful.

The foregoing, and other objects are achieved in an implement in the form of a relatively small head member adapted to be mounted at the tip of an elongate rod. The head portion is split or slotted at its outer end and the two portions of the head forming the opposite walls of the slot are bent laterally in opposite directions parallel to the opposed walls of the slot. In this manner, a V-shaped notch is formed at the outer end of the head and one of the two laterally inclined arms is formed with a cutting edge along one surface. The other of the two arms is preferably tapered toward its tip for use as a prying implement while the V-shaped notch is likewise useful in attempting to work a line or lure free from an entangling object. The slot in the head portion is preferably of a size to slideably receive the fishing line so that with the line engaged in the slot, the head may be guided by the line to the snag or point of entanglement, even though the snag or point of entanglement may not be visible. The implement is useful for freeing a fouled fishing fly, hook, or other type of lure or the fishing line by lifting, pushing, pulling the lure or by cutting the snag so that the lure can be retrieved, or for severing a fishing line at a point closely adjacent to the fishing lure which has been snagged on underwater or overhead objects.

Other objects and features of the invention will become apparent by reference to the following specification and to the drawings.

Figure 1:
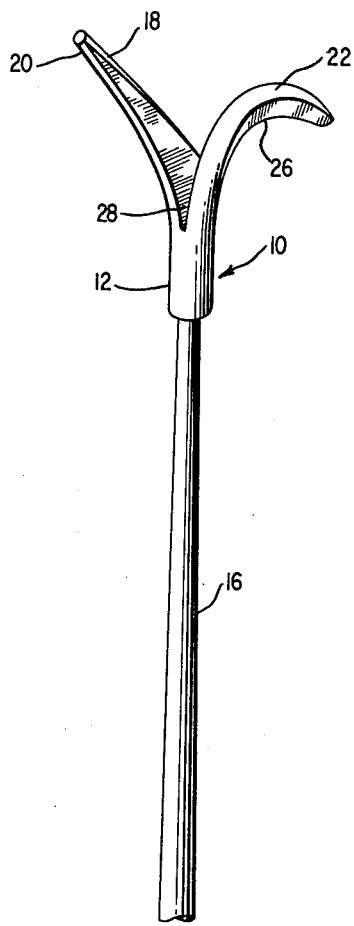
FIG. 1 is a perspective view of one form of implement embodying the invention.
Figure 2:
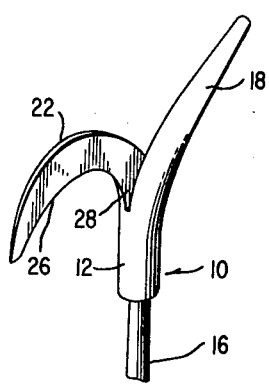
FIG. 2 is a perspective view of the implement of FIG. 1 taken from a position displaced 180° from that of FIG. 1.

In the form shown in the drawings, an implement embodying the invention includes a head or body member designated generally 10 having a vertically elongate cylindrical body portion 12 which may be bored and tapped at its lower end as at 14 to provide a means for securing head 10 upon the tip of an elongate rod partially illustrated at 16.

Preferably head 10 is constructed from a single piece of rod stock cut to the appropriate length and provided with a longitudinal slot extending inwardly from one end to divide a portion of the blank into two opposed portions defining the opposite side walls of the slot. The two opposed portions are then bent laterally outwardly while maintaining the slot side walls in their original planes.

One of the two portions is bent to be inclined laterally upwardly from the upper end of cylindrical portion 12 to define an arm 18 which may be tapered and rounded toward its upper end as at 20.

Figure 3:
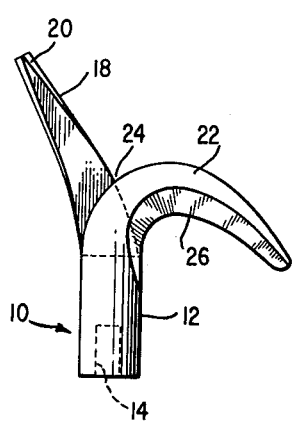
FIG. 3 is a side elevational view of the head portion of the implement of FIG. 1.
Figure 4:
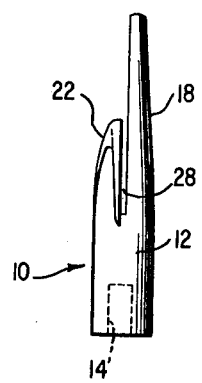
FIG. 4 is a front elevational view of the head portion of the implement of FIG. 1.
Figure 5:
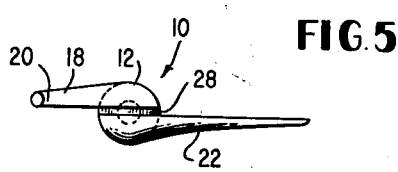
FIG. 5 is a top plan view.

The remaining end portion provided in the manner described above is bent into a substantially U shaped curve to form a second arm 22 which, at the portion adjacent cylindrical portion 12 is inclined upwardly and outwardly from cylindrical portion 12 in the opposite direction from the direction of inclination of arm 18. As best seen in FIG. 3, head 10, when viewed from the side, thus provides a V shaped notch at its upper end as at 24.

The lower edge of arm 22 is provided with a sharpened concavely curved knife edge 26 which faces downwardly toward the lower end of head 10. The overlapped portions of arms 18 and 22 define a slot 28 originally formed by the slotting operation described above which separated the opposed faces of arms 18 and 22.

The implement described above is of great convenience in recovering a fishing line when the line or lure has become entangled or embedded in underwater obstacles or in overhanging brush. In use, head 10 is mounted at the end of a relatively long, preferably extensible rod partially shown at 16. When the lure or hook at the end of the line becomes entangled or snagged, the line is drawn taut and head 10 is engaged with the line with the line seated in slot 28. The implement is then slid along and guided by the line until the point of entanglement or snagging is reached or until the implement is as close as possible to this point. If it is possible to slide the implement entirely to the hook, an attempt may then be made to disengage the hook from the obstacle, either by engaging the hook within the V shaped notch 24 defined at the tip of the head or by attempting to pry the hook loose by the use of arm 18. If efforts to free the hook in this manner are of no avail, the rod is then twisted to engage knife edge 26 with the line or leader and while the line is held taut, a sharp pull of the implement will cause knife edge 26 to sever the line. Alternatively it is sometimes possible to employ knife edge 26 to cut away snagging objects such as twigs, weeds, etc. so that they may be drawn within reach to be freed by hand.

While I have described one embodiment of my invention, it will be apparent to those skilled in the art that the disclosed embodiment may be modified. Therefore, the foregoing description is to be considered exemplary rather than limiting, and the true scope of the invention is that defined in the following claim.

I claim:

An implement of the class described comprising a vertically elongated body having an upper end and a lower end, means on the lower end of said body for mounting said implement on the tip of an elongated rod, the upper end of said body being divided into a pair of arms having facing side surfaces lying in parallel planes, one of said arms being inclined upwardly and laterally from one side of said body, the other of said arms being curved upwardly, outwardly and downwardly from the other side of said body to define with said one arm a V shaped notch at the upper end of said body, the facing side surfaces of said arms below said notch defining a slot extending transversely of said notch in communication therewith and adapted to slideably receive a fishing line or like article, and a concave downwardly facing cutting edge on the lower side of said other arm.

References Cited in the file of this patent

UNITED STATES PATENTS

| | | |
|---|---|---|
| 127,229 | Fasig | May 28, 1872 |
| 245,122 | Bishop | Aug. 2, 1881 |
| 481,763 | Johnson | Aug. 30, 1892 |
| 825,885 | Allen | July 17, 1906 |
| 1,192,200 | Howard | July 25, 1916 |
| 1,851,370 | Munger | Mar. 29, 1932 |
| 2,285,386 | Atwood | June 9, 1942 |
| 2,556,366 | Miller | June 12, 1951 |

FOREIGN PATENTS

| | | |
|---|---|---|
| 780,504 | France | Feb. 4, 1935 |
| 1,585 | Great Britain | 1885 |